United States Patent [19]
Temple et al.

[11] Patent Number: 4,845,517
[45] Date of Patent: Jul. 4, 1989

[54] DROPLET DEPOSITION APPARATUS

[75] Inventors: Stephen Temple; Anthony D. Paton, both of Cambridge, England; A. John Michaelis, Glen Ellyn, Ill.

[73] Assignee: AM International, Inc., Chicago, Ill.

[21] Appl. No.: 142,375

[22] Filed: Jan. 11, 1988

[51] Int. Cl.$^{4}$ .............................................. G01D 15/16
[52] U.S. Cl. .................................. 346/140 R; 417/99
[58] Field of Search ........................... 346/140; 417/99

[56] References Cited

U.S. PATENT DOCUMENTS

| | | | |
|---|---|---|---|
| 1,881,724 | 10/1932 | Lehrer | 417/99 X |
| 2,434,705 | 1/1948 | Lago | 417/99 |
| 3,582,954 | 6/1971 | Skala | 346/140 X |
| 3,747,120 | 7/1973 | Stemme | 346/140 X |
| 4,023,180 | 5/1977 | Zenner | 346/140 X |

OTHER PUBLICATIONS

Tsao, C. S.; Drop-On-Demand Ink Jet Nozzle Array with Two Nozzles/Piezoelectric Crystal; IBM, TDB, V23, N10, Mar. 1981, p. 4438.
Ng, C. S.; Electromagnetic Ink Jet Print Head; IBM, TDB, V26, N3A, Aug. 1983, p. 1040.
Lenneman et al.; Mercury Controlled Ink Jet; IBM TDB, V18, N7, Dec. 1975, p. 2195.

*Primary Examiner*—Joseph W. Hartary
*Attorney, Agent, or Firm*—Nicholas A. Camasto

[57] ABSTRACT

An ink jet"drop-on-demand" printer has a number of parallel channels each containing ink. A thread of mercury extends longitudinally of each channel or pair of channels and is connected for electrical current flow. A magnetic field is applied orthogonally to the channel plane such that current flow in a selected channel causes electromagnetic deformation of the mercury thread. This leads to a pressure pulse in the ink causing ejection of an ink droplet. With a mercury thread shared between a pair of channels, current in the opposite sense results in droplet ejection from the opposite channel of the pair.

31 Claims, 4 Drawing Sheets

DROPLET DEPOSITION APPARATUS

BACKGROUND OF THE INVENTION

This invention relates to pulsed droplet deposition apparatus and more particularly to such apparatus including a plurality of droplet deposition channels. Typical of this kind of apparatus are multi-channel pulsed droplet ink jet printers often also referred to as "drop-on-demand" ink jet printers. In contrast to complexities inherent in other printing systems such as electrostatic, magnetic, electrophotographic, thermal or ion projection, drop-on-demand ink jet printers offer a simple approach to electronically controlled printing with the advantage that the technique is non-contrasting and capable of high speed. It also places the minimum constraints on the ink formulation and printing surfaces.

Attempts have been made to produce multi-channel ink jet printers using piezo-electric actuators and reference is made in this connection to U.S. Pat. Nos. 3,946,398, 3,683,212, 3,747,120, 4,525,728; 4,549,191 and 4,584,590 and IBM Technical Disclosure Bulletin Vol. 23 No. 10 March 1981. According to this art, an ink channel connects an ink reservoir to an ejection nozzle. Piezo-electric transducers adjacent to the channel respond to a voltage impulse to generate a pressure pulse in the ink for ejecting an ink droplet from the nozzle. Piezo-electric actuators have the advantage of low energy requirement and this general approach has proved satisfactory for single nozzle printheads. It has not, however, proved practical for multi-channel printheads where a row of nozzles are to be operated at a relatively high nozzle density. One reason for this is that the piezo-electric transducers supply only limited movement and a relatively large active area, as compared with the nozzle aperture, is required to accomplish sufficient fluid displacement. In addition, the designs of piezo-electrically actuated printheads proposed in the art have not proved amenable to micro-fabrication and are expensive when manually assembled.

A further existing technology for the production of multi-channel drop-on-demand ink jet printers is known from, for example, U.S. Pat. No. 3,179,042; GB-A-2 007 162 and GB-A-2 106 039. These patent specifications disclose thermally operated printheads which, in response to an electrical input signal, generate a heat pulse in selected ink channels to develop a vapour bubble in the ink of those selected channels. This in turn generates a pressure pulse having the pressure and time characteristics appropriate for the ejection of an ink droplet from a nozzle at the end of the channel.

Thermally operated printheads of this nature possess a number of significant disadvantages. First, the thermal mode of operation is inefficient and typically requires 10 to 100 times the energy to produce an ink droplet as compared with known piezo-electric printheads. Second, difficulties are found in providing the very high levels of reliability and extended lifetimes which are necessary in an ink jet printhead. For example, thermal operated printheads have a tendency for ink deposits to form on the heating electrodes. Such deposits have an insulating effect sufficient to increase substantially the electrical pulse magnitude necessary to eject an ink droplet. Thermal stress cracks and element burnout, as well as cavitation erosion, have also proved difficult to eliminate. Third, only ink specifically developed to tolerate thermal cycling can be used and suitable ink formulations often prove to be of low optical density.

A still further technology for a multi-channel ink jet printer is disclosed in U.S. Pat. No. 4,023,180. This relies upon an electrodynamically generated pressure pulse in electrically conductive ink. A magnetic field is applied to the channels and electrodes positioned to enable a current to be passed through the ink in the selected channel. This proposal is not regarded as commercially practical. The resistance of the electrically conductive ink in the channel is found in practice to be comparable with the element resistance in a thermally operated printer as described above. As a consequence, when a current pulse is delivered sufficient to generate an electromagnetic pressure pulse in the ink and therefore expel a droplet, both vapour and electrolytically generated bubbles are also formed and sustained operation has proved impossible.

Reference is further directed to IBM Technical Disclosure Bulletin Vol. 18, No. 7, December 1975. this discloses a multi-nozzle ink jet printhead comprising a stack of wafers positioned between the pole pieces of a magnet. Each wafer provides a nozzle communicating with a funnel-shaped pump chamber. Electrodes project into the pump chamber and are in contact with mercury pellet. Application of a current to the electrodes of any selected wafer causes the associated mercury pellet to be driven towards the nozzle by electrodynamic action causing an ink droplet to be ejected from the nozzle.

If it is desired using this technique to produce an ink jet with a relatively large number of nozzles, bearing in mind that the corresponding wafers are to be accommodated between the pole pieces of a magnet, the gap between the pole pieces would become relatively large. It will be recognised that if a uniform field is to be assured over a wide pole gap, relatively large pole pieces are required; otherwise, edge effects will dominate.

SUMMARY OF THE INVENTION

It is an object of this invention to provide pulsed droplet deposition apparatus which utilises a body of mercury or other liquid metal disposed in a magnetic field and which is better suited than the prior proposal to manufacture at high nozzle densities. It is a further object to provide such apparatus which is economic in manufacture and reliable in use.

Accordingly, the present invention consists in one aspect in pulsed droplet deposition apparatus comprising a plurality of pressure chambers disposed generally in a common plane and each adapted to hold ink; a like plurality of nozzles communicating respectively with the pressure chambers for ejection of droplets of ink; a plurality of electromagnetically deformable means each comprising electrode means and a body of liquid metal in electrical contact with the electrode means; the electromagnetically deformable means being disposed such that each pressure chamber has a body of liquid metal disposed in ink sealing relationship therewith; means for replenishing ink in the pressure chambers; magnetic field means for generating a magnetic field normal to said common plane and drive means for applying an electrical current pulse to a selected electrode means to produce through deformation of the electromagnetically deformable means a pressure pulse in the selected chamber resulting in droplet ejection from the associated nozzle.

Advantageously, the magnetic field means comprises magnetic pole pieces disposed on opposite sides of the common plane with a mutual spacing which is small compared with a dimension of the pole pieces parallel to said plane.

Preferably, said dimension is at least five times said mutual spacing.

It will be recognised that in the apparatus according to this invention, the spacing of the magnetic pole pieces does not increase proportionally with an increase in the number of nozzles and a very large array of nozzles can be provided with a small pole gap. It will be understood that with a pole gap which is small compared to a dimension of the pole pieces orthogonal to the gap, the problem of edge effects in that direction is very much reduced. Comparatively small magnets can therefore be employed. It will in appropriate cases also be possible to employ high coercivity ceramic magnetic strips disposed above and below the channel plane.

According to a further aspect, the present invention consists in pulsed droplet deposition apparatus comprising a plurality of channels each adapted to hold liquid, a like plurality of nozzles communicating respectively with the channels for ejection of droplets of ink; a plurality of electromagnetically deformable means each comprising an elongate body of liquid metal and serving to form in each channel an ink boundary surface extending lengthwise of the channel and electrode means disposed in electrical contact with said body; means for replenishing ink in the pressure chamber; magnetic field means for generating a magnetic field normal to the length of each channel and drive means for applying an electrical current pulse to selected electrode means to produce through deformation of the corresponding electromagnetically deformable means, displacement of said ink boundary surface transversely of a selected channel resulting in droplet ejection from the corresponding nozzle.

It should be understood that the use in such apparatus of an elongate body of mercury or other liquid metal to form an ink boundary surface extending lengthwise of each channel enables a particularly compact construction. A droplet can be regarded as being ejected from the nozzle as the result of an acoustic wave travelling along the channel with contributions from various portions of the length of the displaceable ink boundary surface being made successively throughout the period of the wave.

Advantageously, each electromagnetically deformable means further comprises a solid phase and preferably sinuous conducting element, connected with the electrode means so as to be displaceable thereto, said body of liquid metal being carried on the conducting element.

In this document, the term "ink" is used to describe the liquid deposited in droplet form from pulsed droplet deposition apparatus according to this invention. Whilst the most common form of such apparatus is indeed ink jet printers, it should be recognised that the apparatus may be used to deposit other liquids such as photoresist, sealant, etchant, dilutent, photodeveloper, dye and the like and the term "ink" as used herein is to be regarded as encompassing such liquids.

BRIEF DESCRIPTION OF THE DRAWINGS

The invention will now be described by way of example with reference to the accompanying drawings in which.

DESCRIPTION OF PREFERRED EMBODIMENTS

Figure 1:
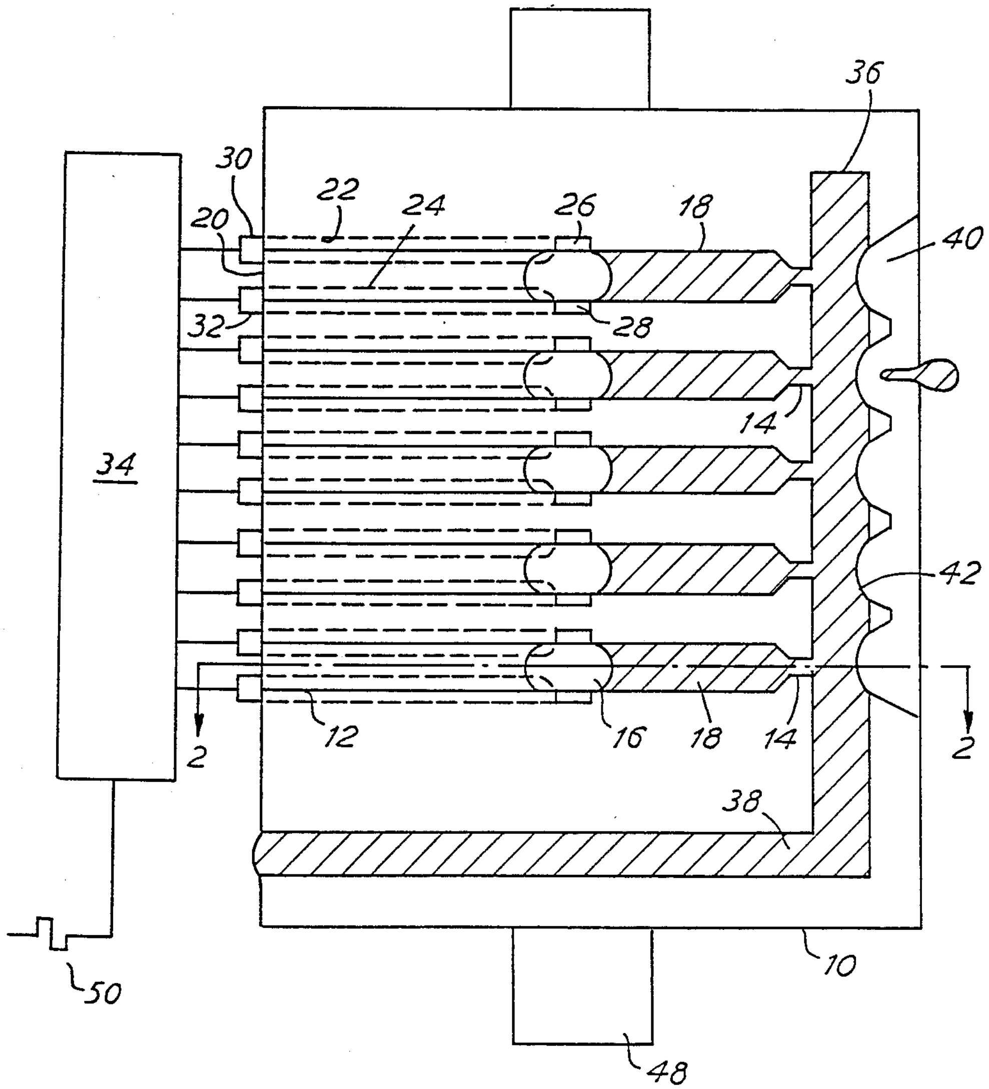
FIG. 1 is a section through an ink jet printhead according to this invention.
Figure 2:
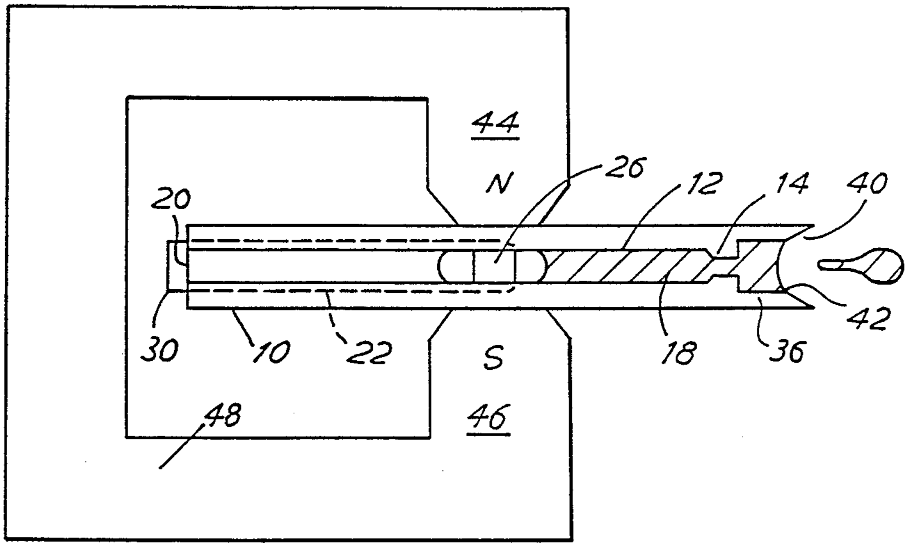
FIG. 2 is a cross section on line 2—2 of FIG. 1.

Referring initially to FIGS 1 and 2, a printhead body 10 is formed with a series of parallel channels 12 each terminating in an orifice 14. The orifice area is smaller than that of the channel area, typically in a ratio 1:6. Each channel 12 contains a small drop of mercury 16 which seals the channel and provides a boundary surface for ink 18 contained in the region of the channel between the mercury drop 16 and the orifice 14. At its opposite end 20, each channel is open to the atmosphere.

Each channel 12 is provided with a pair of conductors 22, 24. At their inward ends, these conductors penetrate the channel to provide opposed electrodes 26, 28 which are in electrical contact with the mercury drop 16 in that channel. The conductors 22, 24 project from the printhead body 10 at their opposite ends to form terminals 30, 32 which are connected with a drive circuit 34.

The volume of mercury drop 16 is chosen so that it contacts the walls of the channel and is therefore bounded by the walls of the channel and the mercury meniscii. The electrodes 26, 28 are treated by, for example, the removal of surface oxides, so that the mercury wets the electrodes. Steps are taken, however, to ensure that the mercury does not wet the channel walls. These steps may include, for example, selecting appropriate materials, applying surface coatings and changing appropriate angles of contact. It is preferable for the volume of the mercury drop 16 to be approximately the smallest volume that satisfies these requirements.

An ink supply manifold 36 extends transversely of the channel 12 and communicates with each of the orifices 14. At one end of the manifold 36, a return 38 is provided for connection with an external ink reservoir. A line of recesses 40 is provided in the printhead body 10 so as to extend into the manifold 36 and to provide a series of apertures 42 in that manifold, each aperture 42 being opposed to one of the nozzles 14. The pressure in the ink reservoir is controlled so that the depth of ink between the nozzle and the ink meniscus is small compared with the nozzle dimension.

As shown most clearly in FIG. 2, the printhead body 10 is disposed between the pole pieces 44, 46 of a permanent magnet 48. The pole pieces extend in the direction parallel to the channels over a length generally equal to the length of the mercury drop. In the direction normal to the channel, the pole pieces extend over the entire channel array and project beyond the outermost channel by the small amount necessary to ensure that the magnetic field at those outermost channels remains uniform. Since the gap between the pole pieces is much smaller than this dimension of the pole pieces, the increase in length necessary to avoid problems with edge effects is proportionately very small.

In operation, when an instruction pulse 50 is applied to the drive circuit 34, a current pulse is generated in the pair of conductors 22, 24 associated with the selected channel. The current pulse flows through the mercury drop and, in the presence of the applied magnetic field, generates an electromagnetic impulsive force in the mercury, which is thereby deformed. The ink boundary surface afforded by the mercury meniscus facing the nozzle is displaced towards the nozzle and a pressure pulse is generated in the ink.

Figure 3:
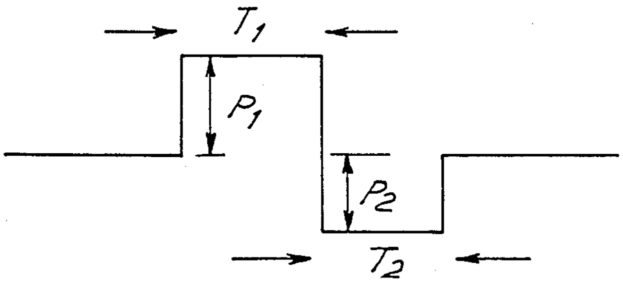
FIG. 3 is a waveform diagram illustrating the drive applied to the apparatus of FIGS. 1 and 2.

The nature of the pressure pulse can best be described with reference to FIG. 3. In a preferred form, it consists of a positive pressure pulse $P_1$ over a first period $T_1$, followed by a negative pressure pulse $P_2$ over a second period $T_2$. Typical values for these parameters are given below using dimensionless units in terms of the radius (r) of the nozzle and the surface tension ($\sigma$) and density (p) of the ink:

$$P_1 = +60\sigma/r$$

$$T_1 = 0.7 \rightarrow (pr^3/\sigma)$$

$$P_2 = -40\sigma/r$$

$$T_2 = 0.4 \rightarrow (pr^3/\sigma)$$

The positive and negative pressure pulses can be generated by applying a shaped current pulse to the conductors 22, 24 with the current flow being reversed in the second period $T_2$. Alternative arrangements for producing the positive and negative pressure pulses will be discussed later in this description. When the positive pressure pulse is applied to ink in the channel 12, ink flowing outwardly through the nozzle 14 causes a pendant drop to be formed from the meniscus of the aperture 42. When the pressure is reversed, the pendant drop is parted from the meniscus and through its momentum is ejected towards the print surface. With the diameter of the aperture 42 being larger than that of the nozzle 14, the diameter of the pendant drop is determined primarily by the diameter of the nozzle and the velocity of ink flow through the nozzle. It should be noted here that the importance of having a thin ink layer between each nozzle and the meniscus, is that the ink velocity is then not materially reduced. If, in an alternative arrangement, the aperture 42 is equal in size or smaller than the nozzle 14, the pendant drop diameter would be controlled by the diameter of the aperture 42 with the other mentioned factors then influencing the energy efficiency of the drop formation but not being the governing factor in the drop size.

During the negative pulse period $T_2$ internal replenishment of the ink in the channel 12 will take place from the manifold 36. Following completion of the negative pulse period, while the ejected drop moves from the printhead, the residual kinetic energy in the ink is gradually damped by viscosity and surface tension forces in the aperture 42 cause ink to be drawn into the manifold 36 from the external supply.

The drive circuit 34 may of course be instructed to energise a number of channels simultaneously. In one form, the drive circuit can be organised so that current flows in parallel through the electrodes of each of the selected channels. In an alternative form, the conductors of those channels that are selected for printing may be connected in series within the drive circuit and a common current pulse passed through them. The preferred arrangement is one in which a combined parallel and series approach is adopted in which the channels are organised in groups and the selected channels in any one group have their conductors connected in series; separate, parallel current flows are established through the conductors of selected channels in each of the other groups.

Whilst the end 20 of each channel is shown in FIG. 1 to be open to the atmosphere, it is possible in an alternative arrangement for the channel to contain a further liquid at the opposite side of the mercury drop from the nozzle. This can be selected to inhibit evaporation of mercury or may contain an inhibitor to inhibit corrosion of the electrodes and maintain wetting with the mercury.

Figure 4:
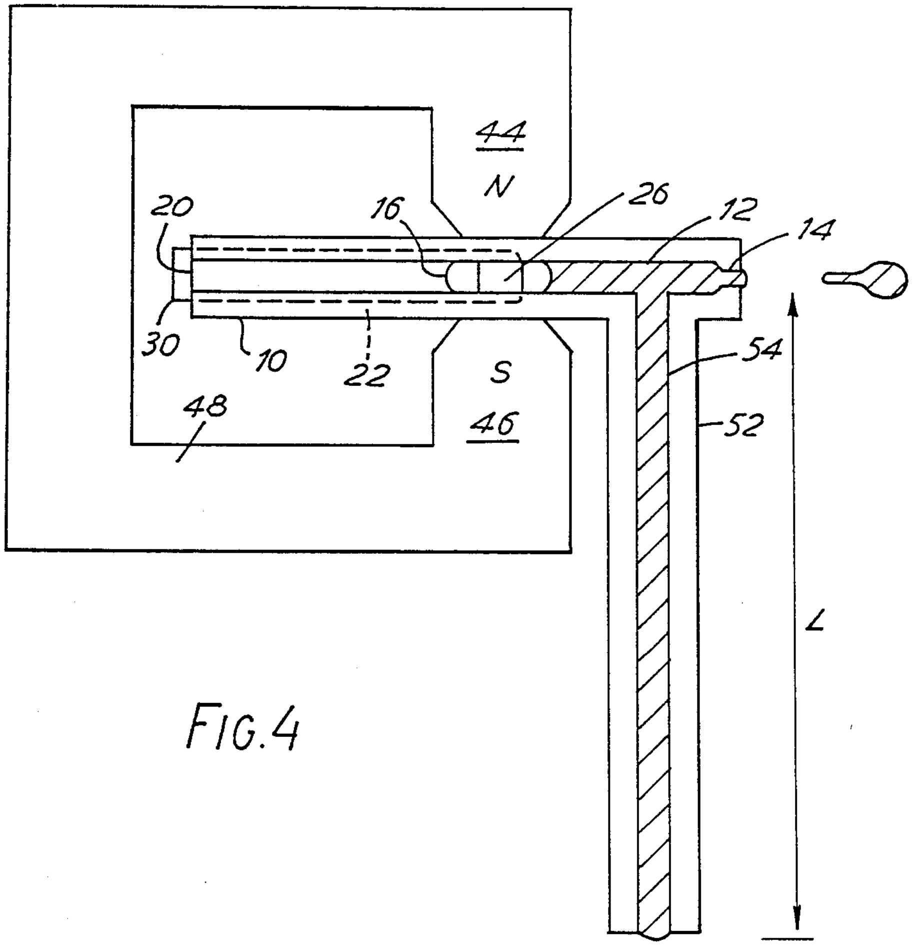
FIG. 4 is a view similar to FIG. 2 illustrating a modification.

Referring now to FIG. 4, there is illustrated a further embodiment of this invention. This is a modification of the embodiment described with reference to FIGS. 1 and 2 and need be discussed only to the extent that it differs from the previously described embodiment. As shown in FIG. 4, the nozzles 14 do not communicate with a manifold but are open to the atmosphere. The mechanism of drop formation is essentially the same as described previously except that the ink meniscus lies at the nozzle. There is however a different method employed for replenishing liquid in the channels.

Disposed orthogonally to the body 10, there is provided an ink supply block 52. Within this block 52 are formed a series of supply channels 54, one for each channel 12. Each supply channel 54 communicates with the corresponding channel 12 at a point intermediate the nozzle 14 and the mercury drop 16. At its opposite end, the supply channel 54 communicates with an external ink reservoir. The length L of each supply channel 54 is long compared with the length of the channels.

In operation, when the ink pressure pulse $P_1$ is applied to the ink channel 12 and a pendant ink droplet formed at the nozzle meniscus, a pressure wave will travel along the length of the supply channel 54, away from the channel 12. Because of the high impedance of the ink in supply channel 54 as compared with the nozzle meniscus, the volume of ink which is displaced into the supply channel is negligible compared with the volume of the ink droplet. After a period 2L/C (where C is the velocity of sound in the ink) a negative pressure wave reflected from the open end of the supply channel is returned. If 2L/C is selected to equal $T_1$, this acoustic wave can be used to supplement or replace the use of a reverse current to provide negative pressure $P_2$.

Figure 5:
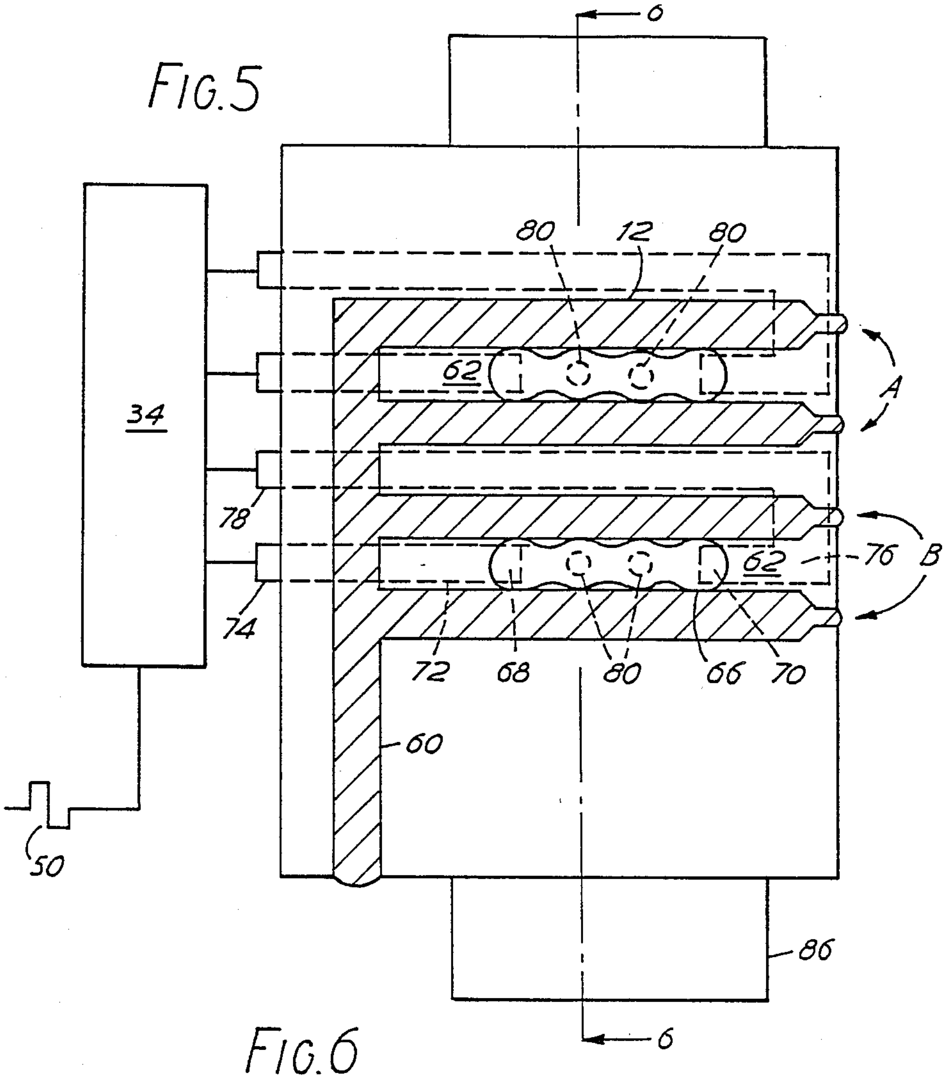
FIG. 5 is a section through an ink jet printhead according to a further embodiment of this invention.

A further embodiment of this invention will now be described with reference to FIGS. 5 and 6. In this arrangement, the ink channels 12 are provided at corresponding ends with nozzles 14 that communicate with the atmosphere. At their opposite ends, the channels 12 are connected with a common ink manifold 60 which is connected in a manner, not shown, with an external ink reservoir.

The channels 12 are arranged in two pairs of which pairs (A) and (B) are illustrated in the drawings. The two channels of each pair are separated by a longitudinal wall 62 which is formed (as seen in FIG. 6) with a window 64 which represents less than half and in this case around one third of the channel wall height. There is disposed within this window 64 a mercury thread 66. As shown best in FIG. 5, the mercury thread 66 extends between electrodes 68 and 70. Electrode 68 is formed by the exposed end of a conductor 72 which extends rearwardly through the printhead to provide at its opposite end a terminal 74 for connection with the drive circuit 34. The electrode 70 comprises the exposed end of a conductor 76 which is of generally J-shape to pass through the printhead avoiding the ink channels 12 to form a terminal 78, again for connection with the drive circuit 34.

It is usually expected that a mercury thread can be drawn to a length no longer than $\pi\times$ diameter. To enable a longer mercury thread to be employed in this embodiment, there are deposited on the base surface of the window 64, two metallic dot regions 80. These can for example be of nickel deposited in any convenient manner. The dot regions are treated by the removal of surface oxides so as to be wetted by the mercury thread. The distance between the two dot regions 80 and between each dot region and the adjacent electrode 68, 70 is selected to be around 2 diameters of the thread so that the thread is supported by surface tension forces in a stable manner.

Figure 6:
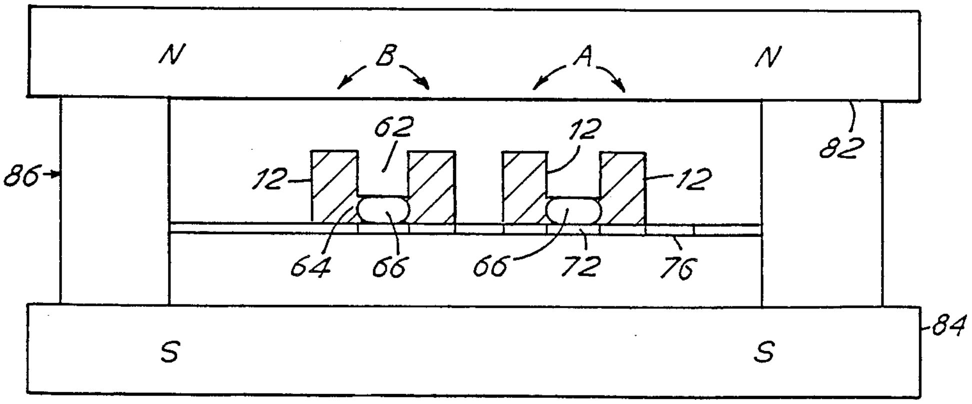
FIG. 6 is a cross-section on line 6—6 of FIG. 5.

The printhead is disposed, as shown in FIG. 6, between the pole pieces 82, 84 of an electromagnet 86.

In operation, when a current pulse is applied to the conductors 72, 76 by the drive circuit 34, the corresponding mercury thread 66 will be displaced laterally of the channel pair so as to create a positive pressure in one of the channels and a negative pressure in the other. The sense of the lateral displacement is of course determined by the sense of the applied current pulse. The positive pressure in the selected channel results in the formation of an ink droplet which becomes detached as the pressure turns negative. In a similar manner to that described in relation to FIG. 4, use can be made of an acoustic wave reflected from the end of the channel remote from the nozzle to produce the negative pressure required to promote droplet "cut-off".

The advantage in keeping the mercury thread thin relative to the channel height is that a given pressure can then be achieved in the ink for a lower applied current.

It will be understood that by applying a current pulse of the opposite sense, a droplet can be ejected from the other channel of the pair A. This sharing of a single mercury drop between two channels enables the nozzle density to be reduced and makes particularly efficient use of the mercury drops and their associated circuitry. Since droplets cannot be ejected simultaneously from both channels of a pair, it is convenient to group the channels into first and second groups with the two channels of any particular pair being assigned to different groups. The drive circuitry 34 is then adapted to alternate between two operating modes; in a first mode only channels of the first group can be actuated whilst in the second mode only channels of the second group. If necessary, the nozzles corresponding to the channels of the first group can be offset relatively to the nozzles of the second group to enable a straight line to be printed across the print surface using all channels.

In a modification, the use of metallic dot regions 80 is replaced by alternative methods of surface treatment. For example, a surface line extending between the electrodes within the window can be treated by metallic ion bombardment so as to provide a surface which is wetted by the mercury thread. The ion concentration is kept very low so that there is no significant electrical conduction. In a similar fashion to the described spaced dot regions, this established a track between the electrodes with the mercury wetting the electrodes and the track but not other wall regions. In this way, surface forces serve to constrain the mercury thread whilst permitting the desired lateral displacement. To a degree, the surface forces can be arranged to apply a restoring force to the displaced thread. This is yet a further technique for applying a negative pressure in the ink channel to promote droplet cut-off. The same technique can be employed with the embodiment of FIGS. 1 and 2. That is to say, the tendency of the mercury drop to return to its equilibrium position through surface forces once current ceases to flow, can be used to supplement or replace the application of a reverse current.

Figure 7:
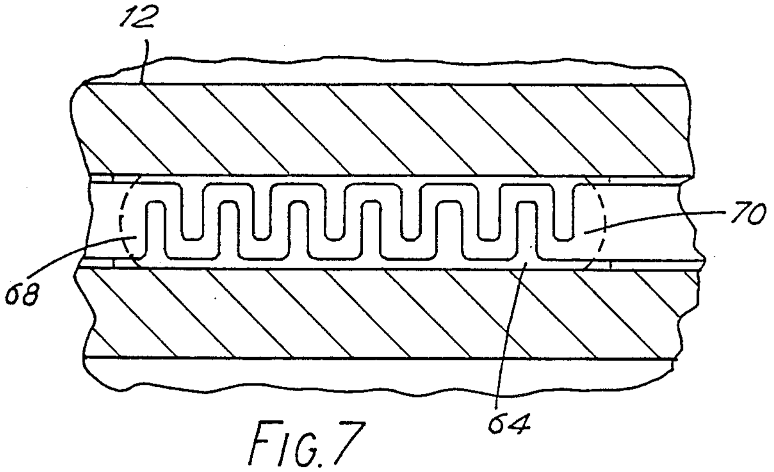
FIG. 7 is a scrap view to an enlarged scale illustrating a modification to the printhead of FIG. 5.

A further modification will now be described with reference to FIG. 7. This is a scrap view in the same plane as FIG. 5, to an enlarged scale. In the FIGURE, two ink channels 12 are shown, together with electrodes 68 and 70 projecting into the window 64. Between the electrodes there extends a sinuous conducting element 64. This is formed integrally with the electrodes 68 and 70 and can conveniently be formed by etching from a single electrode strip. The sinuous conducting element 64 is coated with mercury by a simple dipping operation.

When a current pulse is passed between the electrodes 68 and 70, current will flow through both the conducting element 64 and the mercury 66 and each will be subjected to an electromagnetic force. The acceleration acquired by the body of mercury and by the conducting element under the action of the magnetic field will depend in each case upon the current flow and the mass. The proportion in which current flow is shared between the mercury and the conducting element is, of course, determined by their relative resistances which are in turn governed by resistivity and dimensional factors. In the preferred arrangement, the mercury and the conducting element acquire equal accelerations.

It will be understood that the sinuous nature of the conducting element permits substantial lateral displacement into the selected channel. During this movement, the mercury is carried with the conducting element and affords an ink boundary surface which moves into the channel to create a pressure pulse. In common with the previously described embodiments the mercury creates an ink seal which accommodates the electromagnetic deformation even though the mercury is no longer the sole element which is undergoing that deformation.

It should be understood that this invention has been described by way of example only and a wide variety of modifications are possible without departing from the scope of the invention. Thus, the described permanent magnet may be replaced by a series of magnets. In one form, two high coercivity ceramic magnetic strips may be positioned one above and the other below the channel plane. These strips may be sunk into the printhead body to reduce further the pole gap. In an alternative modification, one or more electromagnets may be employed. These have certain disadvantages as will be apparent but do permit reversal of the magnetic field enabling the electromagnetic force to be reversed without a need for the current to be switched.

The mercury drop can usefully be elongated but the techniques for achieving this are not restricted to those specifically described. The skilled man will understand that a mercury drop can be constrained using surface forces in other ways, although the technique of ensuring differential wetting of neighbouring surfaces is preferred. The described single drop can be replaced by a number of separate drops in each channel. Usefully, these are arranged longitudinally of the channel and electrically interconnected.

In a still further modification, the described sinuous conducting element is replaced by other elongate filaments which extend between and are not necessarily integral with the electrodes. The filament is preferably arranged to have a developed length exceeding its span, but other ways may be found for accommodating the transverse displacement.

Mercury has the advantage of relatively high electrical conductivity, but alternative liquid metals do exist. For example, certain gallium/indium/tin alloys are liquid at convenient operating temperatures.

Whilst the described embodiments utilise parallel channels, it may under certain circumstances be desirable to use other configurations of pressure chambers. Regarding the use of positive and negative pressures to achieve the desired drop formation, this technique has been found to have important advantages in the constructions described. In other constructions according to this invention, it may be possible to achieve the desired drop formation without defined periods of positive and negative applied pressure.

We claim:

1. Pulsed droplet deposition apparatus comprising a plurality of pressure chamber disposed generally in a common plane and each adapted to hold ink; a like plurality of nozzles communicating respectively with the pressure chambers for ejection of droplets of ink; a plurality of electromagnetically deformable means each comprising electrode means and a body of liquid metal in electrical contact with the electrode means; the electromagnetically deformable means being disposed such that each pressure chamber has a body of liquid metal disposed in ink sealing relationship therewith; means for replenishing ink in the pressure chambers; magnetic field means for generating a magnetic field normal to said common plane, the magnetic field means comprising a magnet having pole pieces disposed in alignment with each of said liquid metal bodies on opposite sides of said common plane and with a mutual spacing which is small compared with a dimension of the pole pieces parallel to said plane; and drive means for applying an electrical current pulse to a selected electrode means to produce through deformation of the electromagnetically deformable means a pressure pulse in the selected chamber resulting in droplet ejection from the associated nozzle.

2. Apparatus according to claim 1, wherein said dimension is at least 5 times said mutual spacing.

3. Apparatus according to claim 1, wherein the pressure chambers consist of respective cylindrical channels.

4. Apparatus according to claim 3, wherein the channels are generally parallel.

5. Apparatus according to claim 1, wherein each electrode means comprises a pair of spaced electrodes and said liquid metal body forms a conducting path between said electrodes.

6. Apparatus according to claim 1, wherein each electrode means comprises a pair of spaced electrodes and the electromagnetically deformable means further comprise a solid phase conducting element extending between said electrodes and carrying the body of liquid metal.

7. Apparatus according to claim 6, wherein each conducting element has a developed length substantially in excess of its span.

8. Apparatus according to claim 6, wherein the conducting element is formed integrally with said electrodes.

9. Apparatus according to claim 1, adapted to operate such that said pressure pulse includes in a first period a positive pressure which urges ink from the nozzle in the form of a droplet and in a second period a negative pressure which promotes separation of the ink droplet from the ink meniscus in the nozzle.

10. Apparatus according to claim 9, wherein the drive means is adapted to apply a current pulse of reversed direction to produce a negative pressure.

11. Apparatus according to claim 9, wherein said magnetic field means comprises an electromagnet and wherein means are provided for reversing the magnetic field generated by the electromagnet to provide said negative pressure.

12. Apparatus according to claim 1, wherein said pressure chambers comprise respective parallel channels communicating at corresponding first ends thereof with the respective nozzles and wherein the means for replenishing ink in the pressure chambers comprises a manifold communicating with the channels at respective second ends thereof.

13. Apparatus according to claim 1, wherein surfaces adjoining each body of liquid metal are adapted to constrain the body through surface forces.

14. Apparatus according to claim 13, wherein the walls of each chamber, the body of liquid metal and the electrode means are so adapted that the liquid metal wets the electrode means without wetting the channel walls.

15. Apparatus according to claim 1, wherein each electromagnetically deformable means comprises a plurality of bodies of liquid metal.

16. Pulsed droplet deposition apparatus comprising a plurality of channels disposed generally in a common plane and each adapted to hold ink, a like plurality of nozzles communicating respectively with the channels for ejection of droplets of ink; a plurality of electromagnetically deformable means each comprising an elongate body of liquid metal and serving to form in each channel an ink boundary surface extending lengthwise of the channel and electrode means disposed in electrical contact with said body; means for replenishing ink in the pressure chamber; magnetic means having pole pieces disposed in alignment with each of said liquid metal bodies on opposite sides of said common plane for generating a magnetic field normal to said common plane and drive means for applying an electrical current pulse to selected electrode means to produce through deformation of the corresponding electromagnetically deformable means, displacement of said ink boundary surface transversely of a selected channel resulting in droplet ejection from the corresponding nozzle.

17. Apparatus according to claim 16, wherein each said electromagnetically deformable means further comprises a solid phase conducting element connected with the electrode means so as to be displaceable thereto, said body of liquid metal being carried on the conducting element.

18. Apparatus according to claim 17, wherein the conducting element comprises an elongate filament.

19. Apparatus according to claim 18, wherein the filament is of sinuous form.

20. Apparatus according to claim 17, wherein the liquid metal body is constrained to move with said connecting element by surface forces.

21. Apparatus according to claim 17, wherein the conducting element and the body of liquid metal are adapted to share current flow in such relationship to their respective masses as to acquire substantially equal accelerations on the application of a current pulse to the associated electrode means.

22. Apparatus according to claim 16, wherein each body of liquid metal forms an ink boundary surface in both of two adjacent channels, and is adapted to deform upon the application of a current pulse of appropriate polarity in either of two senses corresponding with said transverse displacement of the respective boundary surfaces.

23. Apparatus according to claim 22, wherein the channels are arranged in pairs with the two channels of each pair being assigned respectively to a first and a second group of said channels, wherein each body of liquid metal is disposed between two channels of a pair so as to provide a liquid boundary surface in each said channel and wherein said drive means is adapted in respective alternating first and second operating modes upon selection of any channel in respectively the first or second group of channels to apply a current pulse of the appropriate polarity to the corresponding electrode means to effect displacement of the ink boundary surface in the selected channel to cause droplet ejection from the associated nozzle.

24. Apparatus according to claim 16, wherein each electromagnetically deformable means further comprises track means adapted through surface forces to constrain movement of the liquid metal body.

25. Apparatus according to claim 24, wherein the channel walls, the body of liquid metal, the electrode means and the track means are so adapted that the liquid metal wets the electrode means and the track means without wetting the channel walls.

26. Apparatus according to claim 25, wherein said track means comprises surface coating means.

27. Apparatus according to claim 26, wherein said surface coating means comprise metallic surface regions.

28. Apparatus according to claim 16, wherein each electromagnetically deformable means comprise a plurality of distinct bodies of liquid metal electrically interconnected through said electrode means and spaced along the length of the or each channel associated therewith.

29. Apparatus according to claim 16, wherein each ink boundary surface is disposed in a window in a wall of the corresponding channel.

30. Apparatus according to claim 29, wherein each window occupies less than one half of the extent of the said wall transversely of the corresponding channel.

31. Apparatus according to claim 29, wherein the extent of said window transversely of the corresponding channel is less than the transverse dimensions of the associated nozzle.

* * * * *